United States Patent
Hwang (10) Patent No.: US 11,061,898 B2
(45) Date of Patent: Jul. 13, 2021

(54) UNCERTAINTY-AWARE SELECTION OF QUERY EXECUTION PLAN

(71) Applicant: SAP SE, Walldorf (DE)

(72) Inventor: Sangyong Hwang, Heidelberg (DE)

(73) Assignee: SAP SE, Walldorf (DE)

( * ) Notice: Subject to any disclaimer, the term of this patent is extended or adjusted under 35 U.S.C. 154(b) by 580 days.

(21) Appl. No.: 15/266,160

(22) Filed: Sep. 15, 2016

(65) Prior Publication Data
US 2018/0075097 A1    Mar. 15, 2018

(51) Int. Cl.
*G06F 16/2453*    (2019.01)

(52) U.S. Cl.
CPC ............... *G06F 16/24542* (2019.01)

(58) Field of Classification Search
CPC ............ G06F 17/30463; G06F 16/24542
USPC .......................................... 707/718
See application file for complete search history.

(56) References Cited

U.S. PATENT DOCUMENTS

| | | | |
|---|---|---|---|
| 5,301,317 A * | 4/1994 | Lohman | G06F 16/24547 |
| 6,092,062 A * | 7/2000 | Lohman | G06F 17/30463 |
| 6,353,818 B1 * | 3/2002 | Carino, Jr. | G06F 16/2462 |
| 6,353,826 B1 * | 3/2002 | Seputis | G06F 16/24545 |
| 6,470,330 B1 * | 10/2002 | Das | G06F 16/2462 |
| | | | 707/718 |
| 6,529,901 B1 * | 3/2003 | Chaudhuri | G06F 16/2462 |
| 6,546,381 B1 * | 4/2003 | Subramanian | G06F 16/24542 |
| 6,862,623 B1 * | 3/2005 | Odhner | G06Q 10/06 |
| | | | 709/226 |
| 9,262,477 B1 * | 2/2016 | Gu | G06F 16/2365 |
| 2004/0059743 A1 * | 3/2004 | Burger | G06F 16/2462 |
| 2005/0091196 A1 * | 4/2005 | Day | G06F 16/24542 |
| 2005/0267866 A1 * | 12/2005 | Markl | G06F 17/30463 |
| 2008/0177722 A1 * | 7/2008 | Lohman | G06F 16/90335 |
| 2008/0195578 A1 * | 8/2008 | Hueske | G06F 16/217 |
| 2009/0024563 A1 * | 1/2009 | Sengar | G06F 11/3452 |
| 2009/0204551 A1 * | 8/2009 | Wang | G06F 16/24542 |
| | | | 705/400 |
| 2009/0276394 A1 * | 11/2009 | Bestgen | G06F 16/24542 |
| 2010/0198811 A1 * | 8/2010 | Wiener | G06F 16/24549 |
| | | | 707/718 |
| 2010/0235349 A1 * | 9/2010 | Kuno | G06F 16/217 |
| | | | 707/718 |

(Continued)

*Primary Examiner* — Tony Mahmoudi
*Assistant Examiner* — Michael Le
(74) *Attorney, Agent, or Firm* — Buckley, Maschoff & Talwalkar LLC (57) ABSTRACT

A system includes reception of a database query, determination of a first logical query execution plan to execute the database query, determination of a second logical query execution plan to execute the database query, determination of a first plurality of resource usage estimates associated with the first logical query execution plan, determination of a second plurality of resource usage estimates associated with the second logical query execution plan, and determination, based on the first plurality of resource usage estimates and the second plurality of resource usage estimates, whether it is determinable to a suitable degree of certainty that one of the first logical query execution plan and the second logical query execution plan will be associated with a smaller amount of resource usage than the other one of the first logical query execution plan and the second logical query execution plan.

21 Claims, 6 Drawing Sheets

(56) References Cited

U.S. PATENT DOCUMENTS

| | | | | |
|---|---|---|---|---|
| 2011/0010359 A1* | 1/2011 | Burger | .............. | G06F 16/24542 |
| | | | | 707/718 |
| 2013/0318069 A1* | 11/2013 | Alu | .................. | G06F 16/24524 |
| | | | | 707/718 |
| 2014/0310302 A1* | 10/2014 | Wu | ....................... | G06F 16/532 |
| | | | | 707/769 |
| 2017/0228425 A1* | 8/2017 | Kandula | ................ | G06N 7/005 |

* cited by examiner

UNCERTAINTY-AWARE SELECTION OF QUERY EXECUTION PLAN

BACKGROUND

Conventional database systems store data and receive queries on the stored data. To respond to a given query, a query execution plan is generated and executed. Since several different query execution plans may be generated for a same query, a query optimizer is used to determine a preferred query execution plan. The query optimizer may determine a preferred query execution plan based on the estimated resource-usage, or cost, of each potential query execution plan. Accordingly, this determination relies on the accuracy of the resource-usage estimates.

Conventional resource-usage estimation techniques are imprecise. The techniques rely on statistical summaries of the stored data to estimate input and output sizes of execution plan operations. Such statistical summaries are inherently imprecise and may not be up-to-date or available. Also, in order to estimate input and output sizes of complex operation trees or graphs, estimates for the operations are combined with assumptions on the interactions between the operations because it is not feasible to create different statistical summaries for all combinations of operations.

For example, in order to estimate the output size of the conjunctive filter A<3 AND B>4, a conventional query optimizer creates statistical summaries over columns 'A' and 'B' separately, estimates the selectivity of 'A<3' and of 'B>4' separately using statistical summaries, and multiplies the selectivities. This approach assumes independence between 'A' and 'B'. However, it is possible that the two predicates are dependent on each other, so that rows matching 'A<3' and those matching 'B>4' are identical or otherwise related.

DETAILED DESCRIPTION

The following description is provided to enable any person in the art to make and use the described embodiments. Various modifications, however, will remain readily apparent to those in the art.

According to some embodiments, resource-usage estimates are determined for query execution plans. Based on the resource-usage estimates, it is determined whether it is uncertain that an optimizer-generated execution plan for a query is more suitable than an execution plan created by literally translating the query. If it is uncertain, the literally-translated execution plan may be selected for execution. Prior to such execution, the user may be presented with an opportunity to manually tune the query by changing the query into a different but equivalent form.

In some embodiments, it is determined whether it is uncertain that one query execution plan is more desirable than another. For example, if uncertainty in the estimation of an input size results in uncertainty in the determination of the better of two alternative query execution plans, then the actual input size may be determined. The determination might be triggered only if the potential resource-usage difference between the alternative plans is larger than the resource usage of the input size determination.

Figure 1:
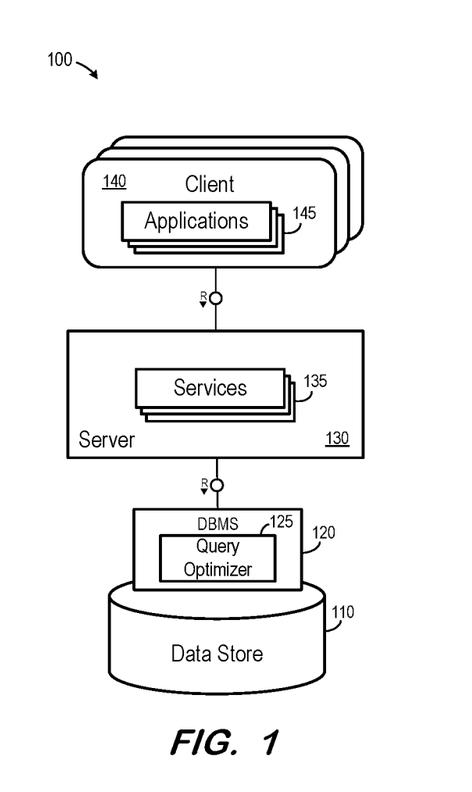
FIG. 1 is a block diagram of a system architecture according to some embodiments.

FIG. 1 is a block diagram of architecture 100 according to some embodiments. Embodiments are not limited to architecture 100 or to a database architecture.

Architecture 100 includes data store 110, database management system (DBMS) 120, server 130, services 135, clients 140 and applications 145. Generally, services 135 executing within server 130 receive requests from applications 145 executing on clients 140 and provides results to applications 145 based on data stored within data store 110.

In one specific example, a client 140 executes an application 145 to present a user interface to a user on a display of the client 140. The user manipulates the user interface to request information, and the application 145 passes a request to one of services 135. A query is generated based on the request and forwarded to DBMS 120. Query optimizer 125 of DBMS 120 generates a query execution plan based on the query and executes the plan to return a result set based on data of data store 110, and the application 145 creates a report/visualization based on the result set.

Data store 110 may comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

One or more services 135 executing on server 130 may communicate with DBMS 120 using database management interfaces such as, but not limited to, Open Database Connectivity (ODBC) and Java Database Connectivity (JDBC) interfaces. These types of services 135 may use Structured Query Language (SQL) to manage and query data stored in data store 110.

Server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145, retrieving data from data store 110 based on the requests, processing the data received from data store 110, and providing the processed data to applications 145. Services 135 may be made available for execution by server 130 via registration and/or other procedures which are known in the art.

Server 130 provides any suitable protocol interfaces through which applications 145 executing on clients 140 may communicate with services 135 executing on application server 130. For example, server 130 may include a HyperText Transfer Protocol (HTTP) interface supporting a transient request/response protocol over Transmission Control Protocol (TCP), and/or a WebSocket interface supporting non-transient full-duplex communications between server 130 and any clients 140 which implement the WebSocket protocol over a single TCP connection.

Server 130 may be separated from or closely integrated with DBMS 120. A closely-integrated server 130 may enable execution of services 135 completely on the database platform, without the need for an additional server. For example, according to some embodiments, server 130 provides a comprehensive set of embedded services which provide end-to-end support for Web-based applications. The services may include a lightweight web server, configurable support for Open Data Protocol, server-side JavaScript execution and access to SQL and SQLScript.

Each of clients 140 may comprise one or more devices executing program code of an application 145 for presenting user interfaces to allow interaction with application server 130. The user interfaces of applications 145 may comprise user interfaces suited for reporting, data analysis, and/or any other functions based on the data of data store 110.

Presentation of a user interface as described herein may comprise any degree or type of rendering, depending on the type of user interface code generated by server 130. For example, a client 140 may execute a Web Browser to request and receive a Web page (e.g., in HTML format) from application server 130 via HTTP, HTTPS, and/or WebSocket, and may render and present the Web page according to known protocols. One or more of clients 140 may also or alternatively present user interfaces by executing a stand-alone executable file (e.g., an .exe file) or code (e.g., a JAVA applet) within a virtual machine. In another method, one or more of clients 140 execute applications 145 loaded from server 130, that receive data and metadata by requests to services 135 executed on the server 130. Data and metadata is processed by the applications 145 to render the user interface on the client 140.

Figure 2:
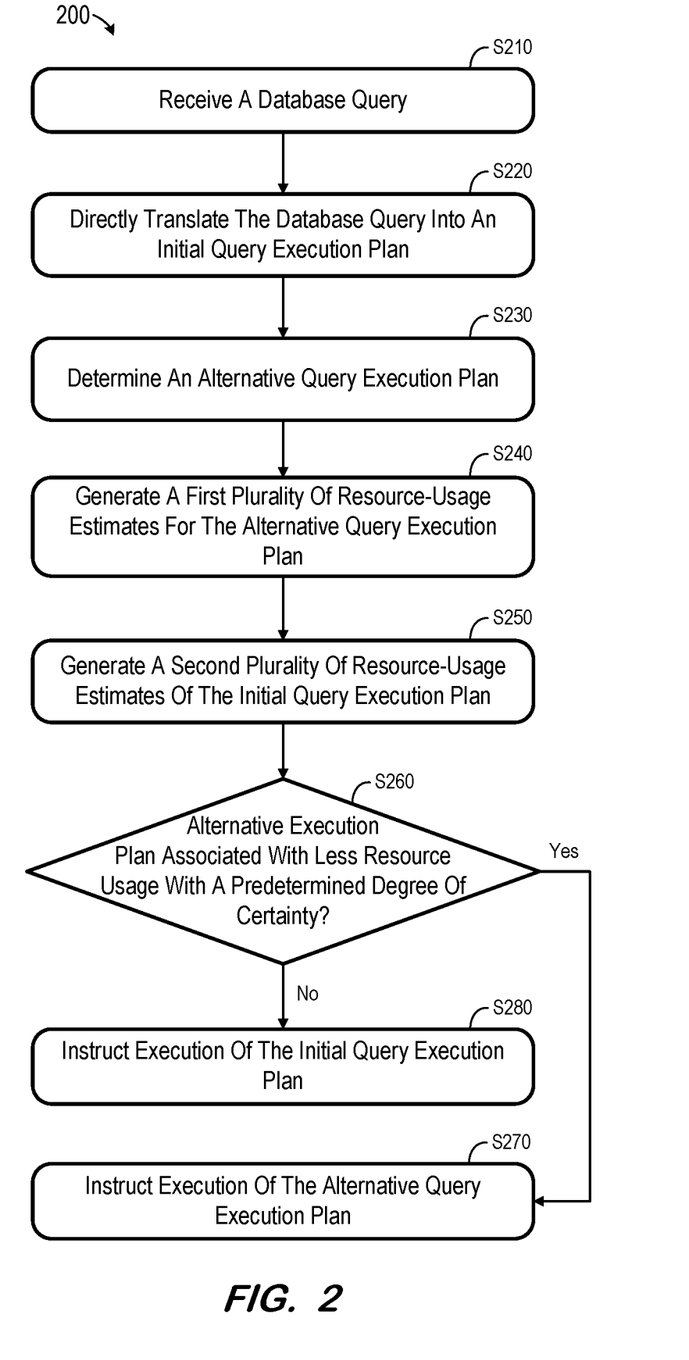
FIG. 2 is a flow diagram of process steps according to some embodiments.

FIG. 2 comprises a flow diagram of process 200 according to some embodiments. In some embodiments, various hardware elements of system 100 execute program code to perform process 200. Process 200 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, a database query is received at S210. The database query may conform to any query language supported by DBMS 120. According to some embodiments, the database query is an SQL query. Next, at S220, the database query is directly translated into an initial query execution plan.

By way of example, it will be assumed that the following database query is received at S210: select * from T inner join S on T.a=S.a inner join Ron S.b=R.b where T.c>100 and T.d<100 and S.c>100 and S.d<100. According to the literal join order of the query, table T and table S are joined first, and then table R is joined to the result. The initial query execution plan determined at S220 may be:

Project(*,InnerJoin($S.b=R.b$,InnerJoin($T.a=S.a$,Select ($T.c>100$ and $T.d<100,T$),Select($S.c<100$ and $S.d<100,S$)),R))

An alternative logical query execution plan is determined at S230. For example, using known techniques, optimizer 125 may generate an "optimized" logical query execution plans which may be used to acquire the same results specified by the received database query. According to some embodiments, the following logical query execution plan is determined at S230:

Project(*,InnerJoin($T.a=S.a$,Select($T.c>100$ and $T.d<100,T$),InnerJoin($S.b=R.b$,Select($S.c<100$ and $S.d<100,S$),R)))

S230 may comprise determining two or more alternative logical query execution plans and selecting a "best" one of the alternatives. Such a determination is known in the art of query optimization.

At S240, two or more resource-usage estimates are determined for the alternative logical query execution plan. Embodiments of S240 may employ any system that is or becomes known for estimating the resource usage, or cost, of execution of a logical query execution plan. The determination may comprise determining a set of physical operators which will be used to execute the logical operators of the logical query execution plan, and estimating the resource usage of the physical operators based on statistics of the table(s) on which the physical operators will operate, and/or on any other information. A plurality of resource usage estimates are also determined for the directly-translated query execution plan at S250.

According to some embodiments, a first particular technique and set of assumptions are used to determine a first resource usage estimate with respect to the initial query execution plan at S240, and the same first technique and assumptions are used to determine a first resource estimate with respect to the alternative query execution plan at S250. Similarly, a second particular technique and set of assumptions are used to determine a second resource usage estimate with respect to the initial query execution plan at S240, and the same second technique and assumptions are used to determine a second resource estimate with respect to the alternative query execution plan at S250. Any number of resource usage estimates for each query execution plan may be determined in this manner.

Various alternatives for estimating resource usage will be described with respect to FIGS. 3A and 3B. Generally, the alternatives may use different calculations and\or different assumptions. These assumptions may include, but are not limited to, assumptions regarding the selectivities of operations, the correlations between column values, etc.

At S260, it is determined whether it can be established to a sufficient certainty that the alternative logical query execution plan is associated with (i.e., requires) less resource usage than the initial query execution plan. The certainty may be calculated in any number of ways, and the threshold of sufficient certainty may be defined with respect to manner in which the certainty is calculated.

According to one example, resource usages may be compared in STRICT or RESPECTIVE modes. In STRICT mode, the superiority of one plan over the other plan (i.e., in terms of lesser resource-usage) is uncertain if all resource-usage estimates of one plan are not less than (or greater than) the resource-usage estimates of the other plan. For example, if three resource-usage estimates {3, 5, 7} have been determined in three different ways for initial plan A and three resource-usage estimates {6, 8, 10} have been determined for alternative plan B, then, in STRICT mode, it is uncertain which plan is superior because the estimate "7" for plan A is greater than the estimate "6" for plan B. However, if the three resource-usage estimates for plan A were {1, 2, 3} then, in STRICT mode, it would be determined at S330 that plan A is associated with less resource usage then plan B.

In RESPECTIVE mode, only those resource-usage estimates which are determined similarly are compared with one another. For example, assuming that three respective different algorithms/assumptions determine resource-usage estimates of {3, 5, 7} for plan A and {6, 8, 10} for plan B, it may be determined at S260 that plan A is associated with less resource usage than plan B because 3<6, 5<8, and 7<10. On the other hand, if the determined resource-usage estimates for plan A are {3, 5, 7} and are {2, 4, 10} for plan B, it is uncertain which plan is associated with less resource usage because estimates "3" and "5" for plan A are greater than estimates "2" and "4" for plan B, but estimate "7" for plan A is less than estimate "10" for plan B.

The RESPECTIVE mode may advantageously provide evaluation of optimization query plans which include portions associated with precise resource-usage estimates and common portions associated with imprecise resource-usage estimates. For example, plan A and plan B may include a common portion for which the imprecise resource-usage estimates {10, 100, 1000} are determined, and different portions associated with relatively precise resource-usage estimates such as {1, 2, 3} (i.e., for plan A) and {4, 5, 6} (i.e., for plan B). Using the RESPECTIVE mode at S260, it may be determined that plan A associated with less resource usage than plan B since the sum of their respective resource-usage estimates are {11, 102, 1003} and {14, 105, 1006}.

Flow proceeds to S270 if the determination at S260 is affirmative. Execution of the alternative query execution plan is instructed at S270. In particular, query optimizer 125 passes the alternative query execution plan to an execution engine of DBMS 120 for execution as is known in the art.

If the determination at S260 is negative, flow proceeds to S280 to instruct execution of the initial query execution plan. According to some embodiments, the user is provided the opportunity to tune the query manually by changing the query into an equivalent but different form. With respect to the present example, the user may be provided the opportunity to choose a join order in which tables S and R are joined first, represented by the following query: select * from S inner join R on S.b=R.b inner join T on S.a=T.a where T.c>100 and T.d<100 and S.c>100 and S.d<100.

Figure 3A:
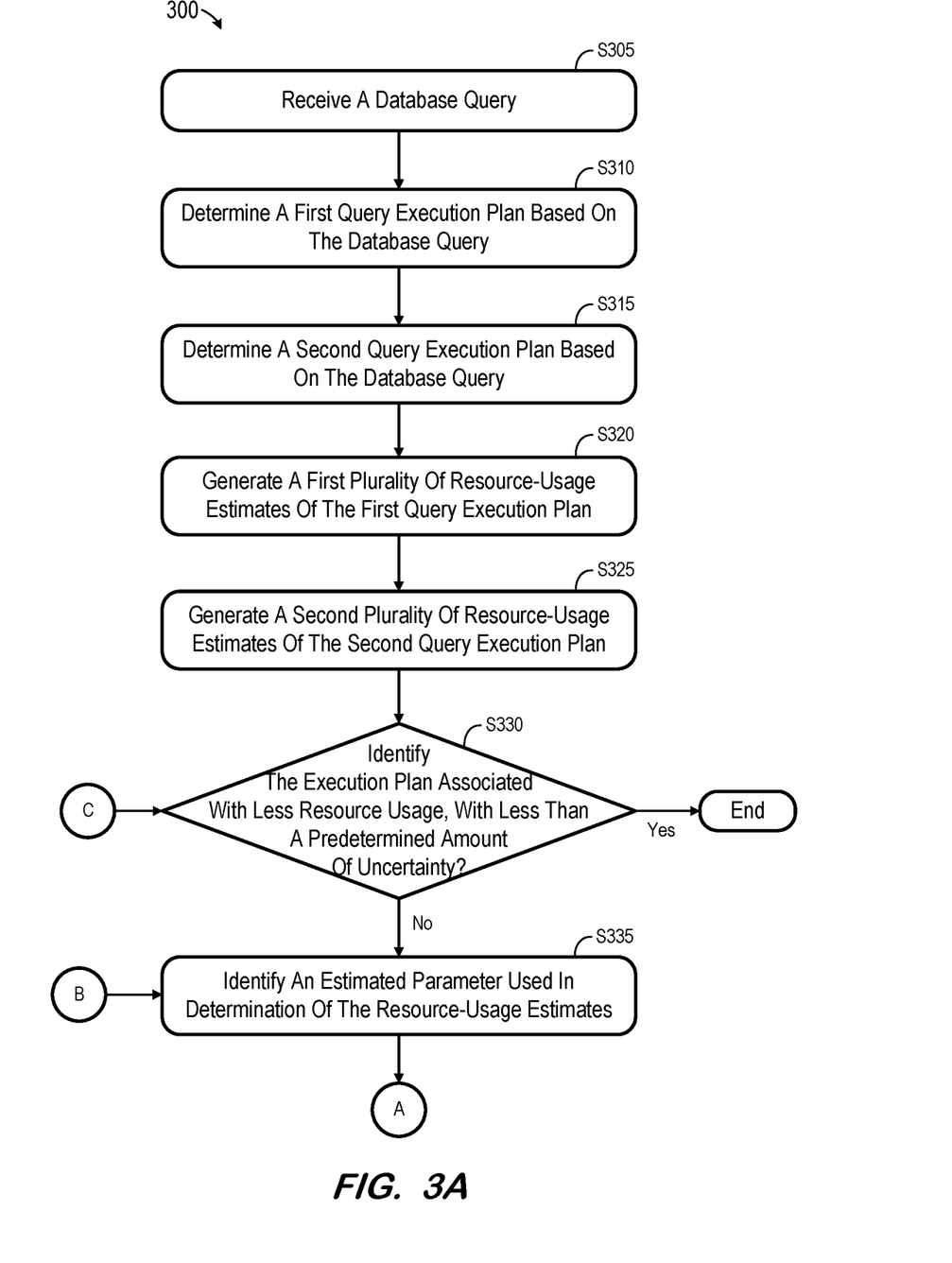
FIGS. 3A and 3B comprise a flow diagram of process steps according to some embodiments.
Figure 3B:
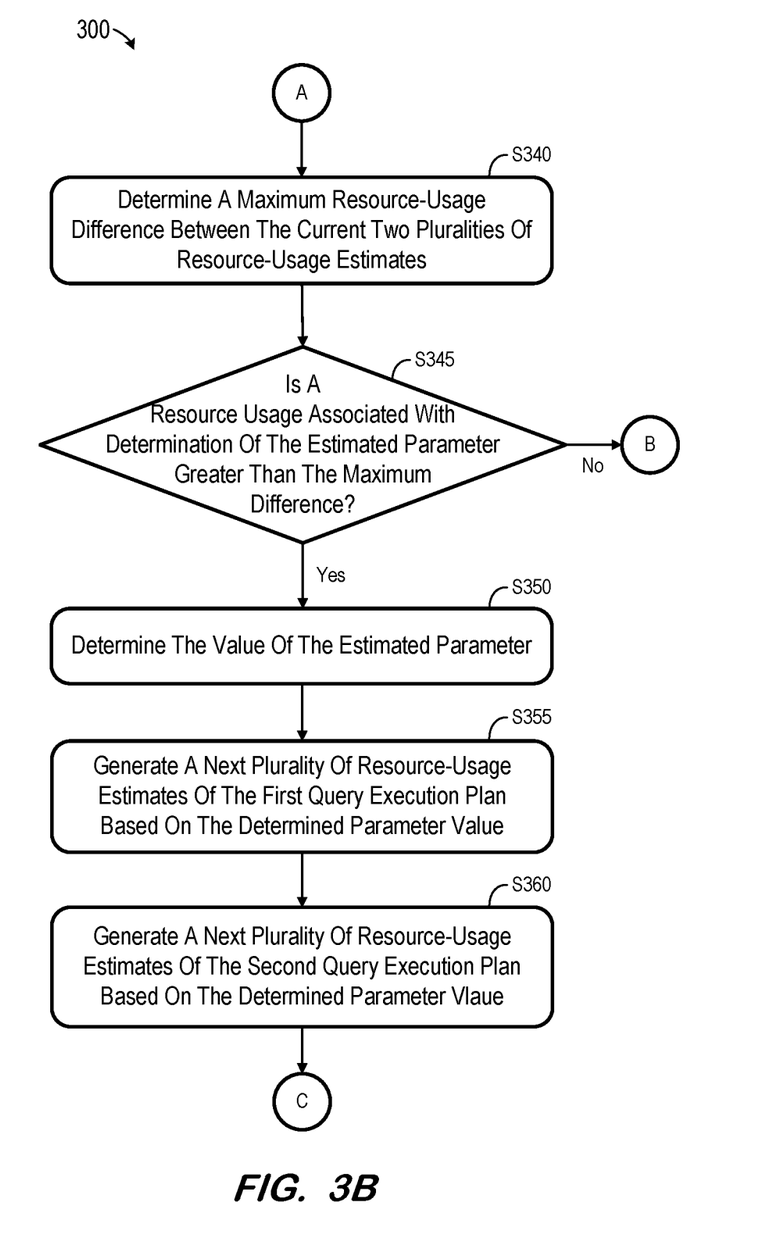

FIGS. 3A and 3B comprise a flow diagram of process 300 according to some embodiments. Optimizer 125 may execute process 300 to compare the resource usage of two alternative logical query execution plans. Many plans may be compared in this manner (i.e., pair-wise) to eventually determine a "best" plan of the many plans.

A database query is received at S305, for example as described above with respect to S210. A first logical query execution plan is determined based on the plan at S310 and a second logical query execution plan is determined based on the query at S315 as is known in the art. Either logical query execution plan may comprise a direct translation of the database query but embodiments are not limited thereto.

As is also known in the art and described above, a first plurality of resource-usage estimates is generated for the first query execution plan at S320 and a second plurality of resource-usage estimates is generated for the second query execution plan at S325. Next, at S330, and similarly to S260 described above, it is determined whether it can be established to a sufficient certainty that one of the first or second logical query execution plans is associated with less resource usage than the other. The determination is based on the first and second pluralities of resource-usage estimates, and may be determined as described above with respect to S260, or in any other suitable manner.

Process 300 terminates if the determination at S330 is affirmative. At this point, optimizer 125 may instruct execution of the identified plan as described with respect to S270. Alternatively, the identified plan may be compared with another alternative plan, e.g., by returning to S325 to generate a plurality of resource-usage estimates for the other plan and proceeding with process 300 from there.

If the determination at S330 is negative, an estimated parameter used in the determination of the resource-usage estimates is identified at S335. For example, the resource-usage determinations for the two alternative query execution plans set forth above are significantly dependent on the selectivities of predicates on table T (T.c>100 and T.d<100) and table S (S.c>100 and S.d<100), because the cost of the join will increase with the number of the input rows and the input size of the second join is dependent on the result size of the first join, which in turn is dependent on the input size of the first join. Estimated values of these selectivities (e.g., estimated based on table statistics) are assumed to have been used during the generation of resource-usage statistics at S320 and S325. Accordingly, more accurate resource-usage estimates may be generated using the actual values of the selectivities of either or both predicates.

Using the actual values of the selectivities of either or both predicates may only be beneficial if the resource-usage associated with determining the selectivities is less than the potential savings in resource-usage resulting from identifying the less resource-intensive execution plan. Accordingly, a maximum resource-usage difference is determined between the first and second pluralities of resource-usage estimates at S340. For example, using the resource-usage estimates of {3, 5, 7} for the first plan and {2, 4, 10} for the second plan, the maximum resource-usage difference determined at S340 is 7 (i.e., |3−10|).

At S345, it is determined whether a resource-usage that will be incurred in order to determine the actual value of the identified estimated parameter (or parameters) is greater than the maximum resource-usage difference determined at S340. If not (i.e., the potential resource-usage savings associated with selecting the "right" plan is less than the resource-usage incurred by calculating the value of the identified parameter), flow returns to S335 to identify another parameter used in determination of the resource-usage estimates. Here, the maximum resource-usage difference is used to check whether it is feasible to identify the actual value. In some embodiments, an expected maximum resource-usage difference can be used as a proxy for the actual maximum resource-usage difference. Flow therefore cycles between S335, S340 and S345 until the determination at S345 is affirmative. According to some embodiments, a negative determination at S345 (or, alternatively, several consecutive negative determinations) results in selection of a directly-translated (and user-modifiable) query execution plan as described with respect to S280. In some embodiments, it is also possible to compare single expected values with the negative determination at S345.

Flow proceeds to S350 if it is determined at S345 that the resource-usage associated with determination of the actual value of the identified parameter (or parameters) is greater than the maximum resource-usage difference. The actual value of the estimated parameter (or parameters) is determined at S350.

Next, a plurality of resource-usage estimates are determined at S355 for the first query execution plan based on the determined parameter value and, at S360, a plurality of resource-usage estimates are determined at S355 for the first query execution plan based on the determined parameter value. Flow then returns to S330 to determine whether either of the plans can be identified as associated with less resource-usage than the other, with at least a predetermined degree of certainty, based on the new resource-usage estimates. If not, flow proceeds to S335 to identify another estimated parameter. As described above, in some embodiments the directly-translated (and user-modifiable) query execution plan is selected after a predetermined number of iterations of S330 or after all parameters have been checked. In some embodiments, it is also possible to compare single expected values after the iterations.

Figure 4:
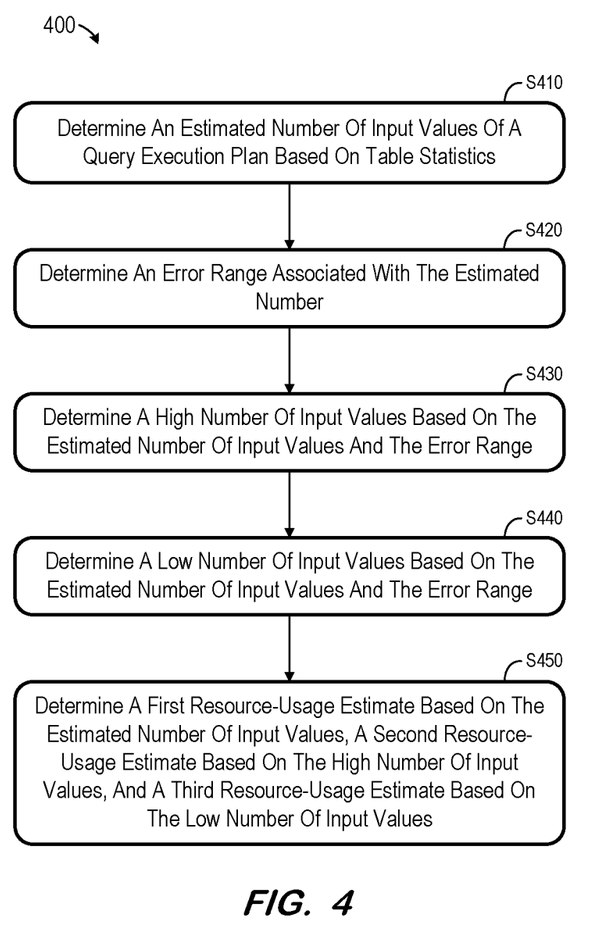
FIG. 4 is a flow diagram of process steps according to some embodiments.

FIG. 4 is a flow diagram of process 400 to determine a plurality of resource-usage estimates associated with a logical query execution plan according to some embodiments. At S410, an estimated number of input values is determined for a query execution plan based on table statistics. Such a determination is known in the art and is used to determine resource-usage estimates. As mentioned above, estimated values of other parameters may also or alternatively be used to determine resource-usage estimates for a logical query plan and may be determined and used in process 400, i.e., embodiments are not limited to an estimated number of input values.

The determination at S410 typically generates an estimated number which lies in the center of a probability range of possible numbers. This probability range is associated with an error range, where numbers outside of the error range are associated with probabilities deemed too low to be considered. The error range is determined at S420.

A high number of input values is determined based on the estimated number of input values and the error range at S430, and a low number of input values is determined based on the estimated number of input values and the error range at S440. According to some embodiments, the high number of input values is equal to the estimated number of input values plus half the error range and the low number of input values is equal to the estimated number of input values minus half the error range. Embodiments are not limited thereto.

Next, at S450, a first resource-usage estimate is determined based on the estimated number of input values, a second resource-usage estimate is determined based on the high number of input values, and a third resource-usage estimate is determined based on the low number of input values. These resource usage estimates may, for example, be used in process 200 and/or process 300 as described above.

Resource-usage estimates may be determined by combining multiple resource-usage estimates, as described in the above Background. According to some embodiments, multiple resource-usage estimates may be combined based on different assumptions regarding the correlations between estimated parameters used in the determination of each of the multiple resource-usage estimates.

A correlation coefficient representing the correlation of two parameters may range from −1 to +1, where 0 indicates independence, +1 indicates positive (direct) dependence, and −1 indicates negative (inverse) dependence. According to some embodiments, multiple resource-usage estimates are combined based on correlation coefficients of 0 and +1, with the assumption that negative dependence is rare.

For example, to conjunctively combine predicate selectivity values, an assumption of independence leads to multiplying the values to obtain a first value and an assumption of complete positive dependence leads to determining the minimum value of the values to obtain a second value. Some embodiments determine the average of the first and second values and use the average to determine a corresponding resource-usage estimate.'

Disjunctive combination of predicate selectivity values can be derived using the formula: p+q−conjunctive combination of p and q, where p and q are selectivity values of two predicates to be combined disjunctively. Combined distinct value count may be defined as the inverse of combined conjunctive selectivity of exact matches. Formulas for other estimations can also be similarly derived.

For example, it will be assumed that two sets of selectivity estimations {0.1, 0.2, 0.3} and {0.7, 0.8, 0.9} are to be combined to reflect an AND operation. Further assuming combining the predicates by multiplication or taking their minimum, there are eighteen potential combinations of calculations: 0.1×0.7, min(0.1, 0.7), 0.1×0.8, min(0.1, 0.8), 0.1×0.9, min(0.1, 0.9), 0.2×0.7, min(0.2, 0.7), 0.2×0.8, min (0.2, 0.8), 0.2×0.9, min(0.2, 0.9), 0.3×0.7, min(0.3, 0.7), 0.3×0.8, min(0.3, 0.8), 0.3×0.9, and min(0.3, 0.9). To determine a low estimation, the smallest value among the 18 values is determined. However, since it is known that multiplication always produces values smaller than or equal to minimum and increases monotonically with input values for an input value range [0, 1], the minimum may be determined from 0.1×0.7=0.07. To determine a high estimation, the maximum value among the 18 values is determined, which leads to min(0.3, 0.9)=0.3 from the characteristics of the operations. The middle estimation can be computed as (0.2×0.8+min(0.2, 0.8))/2=0.18, i.e., by taking the average of the two above-described methods of calculation for middle values.

Figure 5:
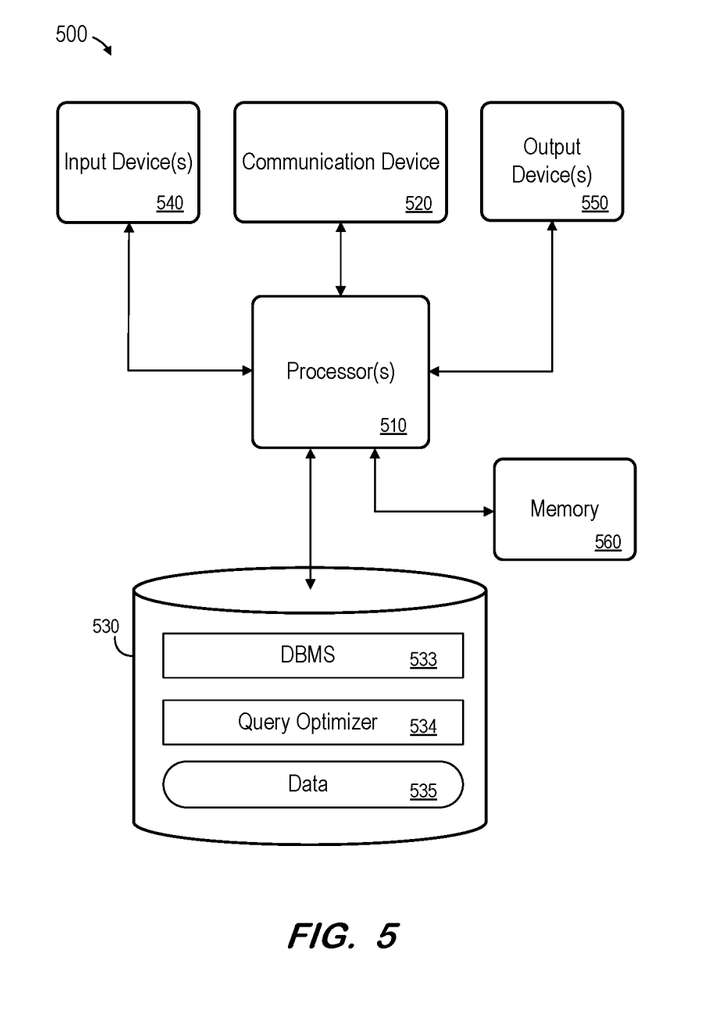
FIG. 5 is a block diagram of a computing system according to some embodiments.

FIG. 5 is a block diagram of apparatus 500 according to some embodiments. Apparatus 500 may comprise a general-purpose computing apparatus and may execute program code to perform any of the functions described herein. Apparatus 500 may comprise an implementation of DBMS 120 and data store 110 in some embodiments. Apparatus 500 may include other unshown elements according to some embodiments.

Apparatus 500 includes processor(s) 510 operatively coupled to communication device 520, data storage device 530, one or more input devices 540, one or more output devices 550 and memory 560. Communication device 520 may facilitate communication with external devices, such as a reporting client, or a data storage device. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to enter information into apparatus 500. Output device(s) 550 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 560 may comprise Random Access Memory (RAM).

DMBS 533 and query optimizer 534 may each comprise program code executed by processor(s) 510 to cause apparatus 500 to perform any one or more of the processes described herein. Embodiments are not limited to execution of these processes by a single apparatus.

Data 535 may include conventional database data as described above. As also described above, database data (either cached or a full database) may be stored in volatile memory such as volatile memory 560. Data storage device 530 may also store data and other program code for providing additional functionality and/or which are necessary for operation of apparatus 500, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a hardware memory storing first processor-executable program code; and
   a hardware processor to execute the processor-executable program code in order to cause the system to:
   receive a database query;
   determine a first logical query execution plan to execute the database query;
   determine a second logical query execution plan to execute the database query;
   determine a first plurality of resource usage estimates associated with the first logical query execution plan, wherein each of the resource usage estimates for the first plurality of resource usage estimates is an estimate for a plurality of parameters and wherein a different method is used to calculate each estimate of the first plurality of resource usage estimates;
   determine a second plurality of resource usage estimates associated with the second logical query execution plan and wherein each resource usage estimate of the second plurality of resource usage estimates is calculated with a corresponding method to each method used to calculate the first plurality of resource usage estimates;
   calculate a certainty value that indicates whether it can be determined with sufficient certainty that one of the first logical query execution plan and the second logical query execution plan uses a smaller amount of estimated resource usage, wherein the certainty value is calculated based on one of a plurality of modes which compare the first plurality of resource usage estimates with the second plurality of resource usage estimates; and
   determine, based on a comparison of the first plurality of resource usage estimates with the second plurality of resource usage estimates, which one of the first logical query execution plan and the second logical query execution plan uses a smaller amount of estimated resource usage in a case that the certainty value indicates that it can be determined with sufficient certainty that one of the first logical query execution plan and the second logical query execution plan uses the smaller amount of estimated resource usage;
   execute the one of the first logical query execution plan and the second logical query execution plan determined to use the smaller amount of estimated resource usage.

2. A system according to claim 1, wherein determination of the first logical query execution plan comprises:
   direct translation of the database query into a sequence of logical operators.

3. A system according to claim 1, wherein determination of the first plurality of resource usage estimates associated with the first logical query execution plan comprises:
   determination of an estimated value of a parameter;
   determination of a first one of the first plurality of resource usage estimates associated with the first logical query execution plan based on the estimated value of the parameter;
   determination of a second estimated value of the parameter; and
   determination of a second one of the first plurality of resource usage estimates associated with the first logical query execution plan based on the second estimated value of the parameter.

4. A system according to claim 3, wherein determination of a second estimated value of the parameter comprises:
   determination of an error range associated with the estimated value of the parameter; and
   determination of the second estimated value of the parameter based on the error range.

5. A system according to claim 1, wherein determination of which one of the first logical query execution plan and the second logical query execution plan uses a smaller amount of estimated resource usage than the other one of the first logical query execution plan and the second logical query execution plan comprises:

determination of whether each resource usage estimate of the first plurality of resource usage estimates is smaller than any of each resource usage estimate of the second plurality of resource usage estimates.

6. A system according to claim 1, wherein determination of which one of the first logical query execution plan and the second logical query execution plan uses a smaller amount of estimated resource usage than the other one of the first logical query execution plan and the second logical query execution plan comprises:

determination of whether each of the first plurality of resource usage estimates is smaller than a respective one of the second plurality of resource usage estimates.

7. A system according to claim 1, wherein, in a case that the certainty value does not indicate that it can be determined with sufficient certainty that one of the first logical query execution plan and the second logical query execution plan uses a smaller amount of estimated resource usage than the other one of the first logical query execution plan and the second logical query execution plan, the processor to further execute the processor-executable program code in order to cause the system to:

identify an estimated value of a parameter used in determination of the first plurality of resource usage estimates and the second plurality of resource usage estimates;

determine a resource-usage difference based on the first plurality of resource usage estimates and the second plurality of resource usage estimates;

determine that a resource usage associated with calculation of an actual value of the parameter is smaller than the resource-usage difference; and in response to the determination that the resource usage associated with calculation of the actual value of the parameter is smaller than the resource-usage difference:

calculate the actual value of the parameter;
determine a third plurality of resource usage estimates associated with the first logical query execution plan based on the actual value; and
determine a fourth plurality of resource usage estimates associated with the second logical query execution plan based on the actual value.

8. A system according to claim 1, the processor to further execute the processor-executable program code in order to cause the system to:

instruct execution of the first logical query execution plan in a case that the certainty value indicates that it cannot be determined with sufficient certainty that one of the first logical query execution plan and the second logical query execution plan uses a smaller amount of resource usage than the other one of the first logical query execution plan and the second logical query execution plan.

9. A system according to claim 1, wherein the plurality of modes for calculating the certainty value comprises:

a strict mode that evaluates whether all of the plurality of resource usage estimates associated with one of the first logical query execution plan and the second logical query execution plan are less than all of the plurality of resource usage estimates associated with the other of the first logical query execution plan and the second logical query execution plan; and a respective mode that compares each of the plurality of resource usage estimates associated with one of the first logical query execution plan and the second logical query execution plan, to a respective one of the plurality of resource usage estimates associated with the other of the first logical query execution plan and the second logical query execution plan, wherein at least two of the plurality of resource usage estimates are compared to each other in a case that the at least two of the plurality of resource usage estimates are determined by a same process.

10. A computer-implemented method, comprising:

receiving a database query;

determining a first logical query execution plan to execute the database query over stored data;

determining a second logical query execution plan to execute the database query over the stored data;

determining a first plurality of resource usage estimates associated with the first logical query execution plan, wherein each of the resource usage estimates of the first plurality of resource usage estimates is an estimate for a plurality of parameters and wherein a different method is used to calculate each estimate of the first plurality of resource usage estimates;

determining a second plurality of resource usage estimates associated with the second logical query execution plan and wherein each resource usage estimate of the second plurality of resource usage estimates is calculated with a corresponding method to each method used to calculate the first plurality of resource usage estimates;

calculating a certainty value that indicates whether it can be determined with sufficient certainty that one of the first logical query execution plan and the second logical query execution plan uses a smaller amount of estimated resource usage, wherein the certainty value is calculated based on one of a plurality of modes, which compare the first plurality of resource usage estimates with the second plurality of resource usage estimates;

comparing the first plurality of resource usage estimates with the second plurality of resource usage estimates to determine which one of the first logical query execution plan and the second logical query execution plan uses a smaller amount of estimated resource usage in a case that the certainty value indicates that it can be determined with sufficient certainty that one of the first logical query execution plan and the second logical query execution plan uses the smaller amount; and executing the one of the first logical query execution plan and the second logical query execution plan determined to use the smaller amount of estimated resource usage.

11. A method according to claim 10, wherein determining the first logical query execution plan comprises:

directly translating the database query into a sequence of logical operators.

12. A method according to claim 10, wherein determining the first plurality of resource usage estimates associated with the first logical query execution plan comprises:

determining an estimated value of a parameter;

determining a first one of the first plurality of resource usage estimates associated with the first logical query execution plan based on the estimated value of the parameter;

determining a second estimated value of the parameter; and determining a second one of the first plurality of resource usage estimates associated with the first logical query execution plan based on the second estimated value of the parameter.

13. A method according to claim 12, wherein determining a second estimated value of the parameter comprises:
   determining an error range associated with the estimated value of the parameter; and
   determining the second estimated value of the parameter based on the error range.

14. A method according to claim 10, wherein determining which one of the first logical query execution plan and the second logical query execution plan uses a smaller amount of estimated resource usage than the other one of the first logical query execution plan and the second logical query execution plan comprises:
   determining whether each resource usage estimate of the first plurality of resource usage estimates is smaller than any of each resource usage estimate of the second plurality of resource usage estimates.

15. A method according to claim 10, wherein determining which one of the first logical query execution plan and the second logical query execution plan uses a smaller amount of estimated resource usage than the other one of the first logical query execution plan and the second logical query execution plan comprises:
   determining whether each of the first plurality of resource usage estimates is smaller than a respective one of the second plurality of resource usage estimates.

16. A method according to claim 10, wherein, in a case that the certainty value indicate that it cannot be determined with sufficient certainty that one of the first logical query execution plan and the second logical query execution uses a smaller amount of estimated resource usage than the other one of the first logical query execution plan and the second logical query execution plan, the method further comprises:
   identifying an estimated value of a parameter used in determination of the first plurality of resource usage estimates and the second plurality of resource usage estimates;
   determining a resource-usage difference based on the first plurality of resource usage estimates and the second plurality of resource usage estimates;
   determining that a resource usage associated with calculation of an actual value of the parameter is smaller than the resource-usage difference; and
   in response to determining that the resource usage associated with calculation of the actual value of the parameter is smaller than the resource-usage difference:
      calculating the actual value of the parameter;
      determining a third plurality of resource usage estimates associated with the first logical query execution plan based on the actual value; and
      determining a fourth plurality of resource usage estimates associated with the second logical query execution plan based on the actual value.

17. A method according to claim 10, further comprising:
   instructing execution of the first logical query execution plan in a case that the certainty value indicates that it cannot be determined with sufficient certainty that one of the first logical query execution plan and the second logical query execution plan uses a smaller amount of estimated resource usage than the other one of the first logical query execution plan and the second logical query execution plan.

18. A non-transitory computer-readable medium storing program code, the program code executable to:
   receive a database query;
   determine a first logical query execution plan to execute the database query;
   determine a second logical query execution plan to execute the database query;
   determine a first plurality of resource usage estimates associated with the first logical query execution plan, wherein each of the resource usage estimates of the first plurality of resource usage estimates is an estimate for a plurality of parameters and wherein a different method is used to calculate each estimate of the first plurality of resource usage estimates;
   determine a second plurality of resource usage estimates associated with the second logical query execution plan and wherein each resource usage estimate of the second plurality of resource usage estimates is calculated with a corresponding method to each method used to calculate the first plurality of resource usage estimates;
   calculate a certainty value that indicates whether it can be determined with sufficient certainty that one of the first logical query execution plan and the second logical query execution plan uses a smaller amount of estimated resource usage, wherein the certainty value is calculated based on one of a plurality of modes, which compare the first plurality of resource usage estimates with the second plurality of resource usage estimates;
   determine, based on a comparison of the first plurality of resource usage estimates with the second plurality of resource usage estimates, which one of the first logical query execution plan and the second logical query execution plan is associated with a smaller amount of estimated resource usage in a case that the certainty value indicates that it can be determined with sufficient certainty that one of the first logical query execution plan and the second logical query execution plan uses the smaller amount of estimated resources; and
   execute the one of the first logical query execution plan and the second logical query execution plan determined to use the smaller amount of estimated resource usage.

19. A medium according to claim 18, wherein determination of the first plurality of resource usage estimates associated with the first logical query execution plan comprises:
   determination of an estimated value of a parameter;
   determination of a first one of the first plurality of resource usage estimates associated with the first logical query execution plan based on the estimated value of the parameter;
   determination of a second estimated value of the parameter; and
   determination of a second one of the first plurality of resource usage estimates associated with the first logical query execution plan based on the second estimated value of the parameter.

20. A medium according to claim 19, wherein determination of a second estimated value of the parameter comprises:
   determination of an error range associated with the estimated value of the parameter; and
   determination of the second estimated value of the parameter based on the error range.

21. A medium according to claim 18, the program code is further executable to, in a case that the certainty value indicates that it cannot be determined with sufficient certainty that one of the first logical query execution plan and the second logical query execution plan will use a smaller amount of estimated resource usage than the other one of the first logical query execution plan and the second logical query execution plan:
- identify an estimated value of a parameter used in determination of the first plurality of resource usage estimates and the second plurality of resource usage estimates;
- determine a resource-usage difference based on the first plurality of resource usage estimates and the second plurality of resource usage estimates;
- determine that a resource usage associated with calculation of the actual value of the parameter is smaller than the resource-usage difference; and
- in response to the determination that the resource usage associated with calculation of the actual value of the parameter is smaller than the resource-usage difference:
  - calculate the actual value of the parameter;
  - determine a third plurality of resource usage estimates associated with the first logical query execution plan based on an actual value; and
  - determine a fourth plurality of resource usage estimates associated with the second logical query execution plan based on the actual value.

\* \* \* \* \*